UNITED STATES PATENT OFFICE.

LEWIS E. SAUNDERS AND RAY HILL WHITE, OF NIAGARA FALLS, NEW YORK, ASSIGNORS TO NORTON COMPANY, OF WORCESTER, MASSACHUSETTS, A CORPORATION OF MASSACHUSETTS.

ALUMINOUS ABRASIVE.

1,247,337.   Specification of Letters Patent.   Patented Nov. 20, 1917.

No Drawing.   Application filed February 12, 1917.   Serial No. 148,264.

*To all whom it may concern:*

Be it known that we, LEWIS E. SAUNDERS and RAY HILL WHITE, citizens of the United States, residing at Niagara Falls, in the county of Niagara and State of New York, have invented certain new and useful Improvements in Aluminous Abrasives, of which the following is a specification.

This invention relates to a novel abrasive material consisting essentially of alumina and iron oxid, the alumina in crystalline form and in preponderant proportion. The composition is substantially free from silica and oxid of titanium; that is to say, these oxids, if present at all, exist in such minor proportions, usually less than one per cent., as to have no material or substantial influence upon the abrasive properties of the product.

It is recognized that an abrasive consisting of crystalline alumina substantially free from fluxing impurities, as disclosed in U. S. Patent No. 954,808, patented April 12, 1910, to Jeppson and Saunders, presents advantages over all other known abrasives for certain specific purposes, including precision steel grinding. This abrasive is however costly to manufacture, inasmuch as alumina of the requisite purity is at the present time commercially obtainable only through chemical processes involving the solution and precipitation of alumina. This fact has limited the use of the abrasive, and has rendered impracticable its application to many grinding operations for which it is particularly adapted.

Careful investigations have shown that the superiority of the pure aluminous abrasive is in large part due to the fact that the grain possesses a relatively weak structure, combined with a relatively high degree of hardness. By weak structure it is meant that the particles or grains of the abrasive break down comparatively readily when subjected to compression or impact, or under the conditions of use in the grinding operation.

The principal impurities which are normally associated with alumina in native ores are, as is well known, silica, titanium oxid and iron oxid. Examination of abrasives consisting essentially of alumina associated with material amounts of silica and titanium oxid has shown that these latter oxids, individually or together, in limited proportions, very materially increase the strength of the abrasive grain. For example, this effect is strongly marked when silica is present to the extent of three to four per cent., the balance being alumina.

We have found that the effects due to ferric oxid differ entirely from those due to the oxids of silicon and titanium. When ferric oxid is introduced into the composition of the aluminous abrasive in proportions up to ten per cent. or even higher, it is without ill effect upon the grain, and appears to be essentially neutral in its action: that is, it seems to act merely as a neutral diluent for the alumina, the essential valuable properties of which are retained substantially unimpaired. On the other hand, the presence of ferric oxid in material proportions offers certain very definite and positive advantages, both from an operating and from a commercial viewpoint.

Abrasives such as are herein referred to are prepared by fusing the appropriate charge in an electric furnace, the homogeneous molten mass being either permitted to cool or chilled in the furnace, or poured or tapped therefrom. Iron oxid reduces the melting-point of the charge, as compared with pure alumina, and therefore permits fusion with less expenditure of energy. Moreover, the lower melting-point is in itself a decided operating advantage, since less difficulty is experienced in pouring or tapping the product, when it is desired to do so. This results from the fact that the fluidity of the bath is increased as compared with the bath of substantially pure alumina.

Our invention is of considerable technical and commercial importance, inasmuch as it enables us to produce an abrasive which is essentially similar in its application and mode of use to the valuable product made from substantially pure alumina, the new abrasive being however prepared from less pure and therefore less costly materials. It is therefore capable of more extended use. For example, there occur certain natural sulfates of aluminum which appeared at first to offer cheap sources of pure alumina as the manufacturing operations are very simple, comprising solution in warm water, filtration, evaporation, and roasting. Unfortunately such ores contain considerable amounts of iron which contaminate the alumina obtained by the process described. Such raw materials may however be readily used by us, resulting in a considerable saving. Other sources of raw material available for the manufacture of the abrasive herein described will occur to those familiar with the art. For example, certain slags or by-products resulting from thermit smelting or welding processes are available, such processes depending on the reaction between metallic aluminum and ferric oxid. Another source which may be mentioned is the product obtained from clay by methods involving the use of hydrofluoric acid, etc., without the necessity of completely eliminating the iron oxid, such elimination being as is well known a difficult or troublesome step in processes of this type.

The following are analyses of certain representative products prepared with varying proportions of iron oxid, but free from substantial proportions of other fluxing oxids:—

| $Al_2O_3$ | $Fe_2O_3$ | $SiO_2$ | $TiO_2$ |
|---|---|---|---|
| 98.80 | 1.09 | 0.11 | 0.0 |
| 98.61 | 1.37 | 0.02 | 0.0 |
| 94.26 | 5.69 | 0.05 | 0.0 |
| 84.82 | 14.51 | 0.67 | 0.0 |

A product of the desired composition, containing say 1 to 15 per cent. of ferric oxid, is easily prepared by fusing the appropriate charge containing alumina and ferric oxid, in an electric furnace of the type ordinarily used for the fusion of bauxite, the melted charge being either poured from the furnace or permitted to solidify therein as may be preferred.

We claim:—

1. An electric furnace product comprising crystalline alumina associated with iron oxid, but substantially free from oxids of silicon and titanium.

2. An electric furnace product consisting essentially of crystalline alumina associated with one to fifteen per cent. of iron oxid.

3. An electric furnace product consisting essentially of crystalline alumina associated with iron oxid, said product possessing the essential characteristic qualities of a substantially pure aluminous abrasive.

In testimony whereof, we affix our signatures.

LEWIS E. SAUNDERS.
RAY HILL WHITE.